Patented Jan. 31, 1933

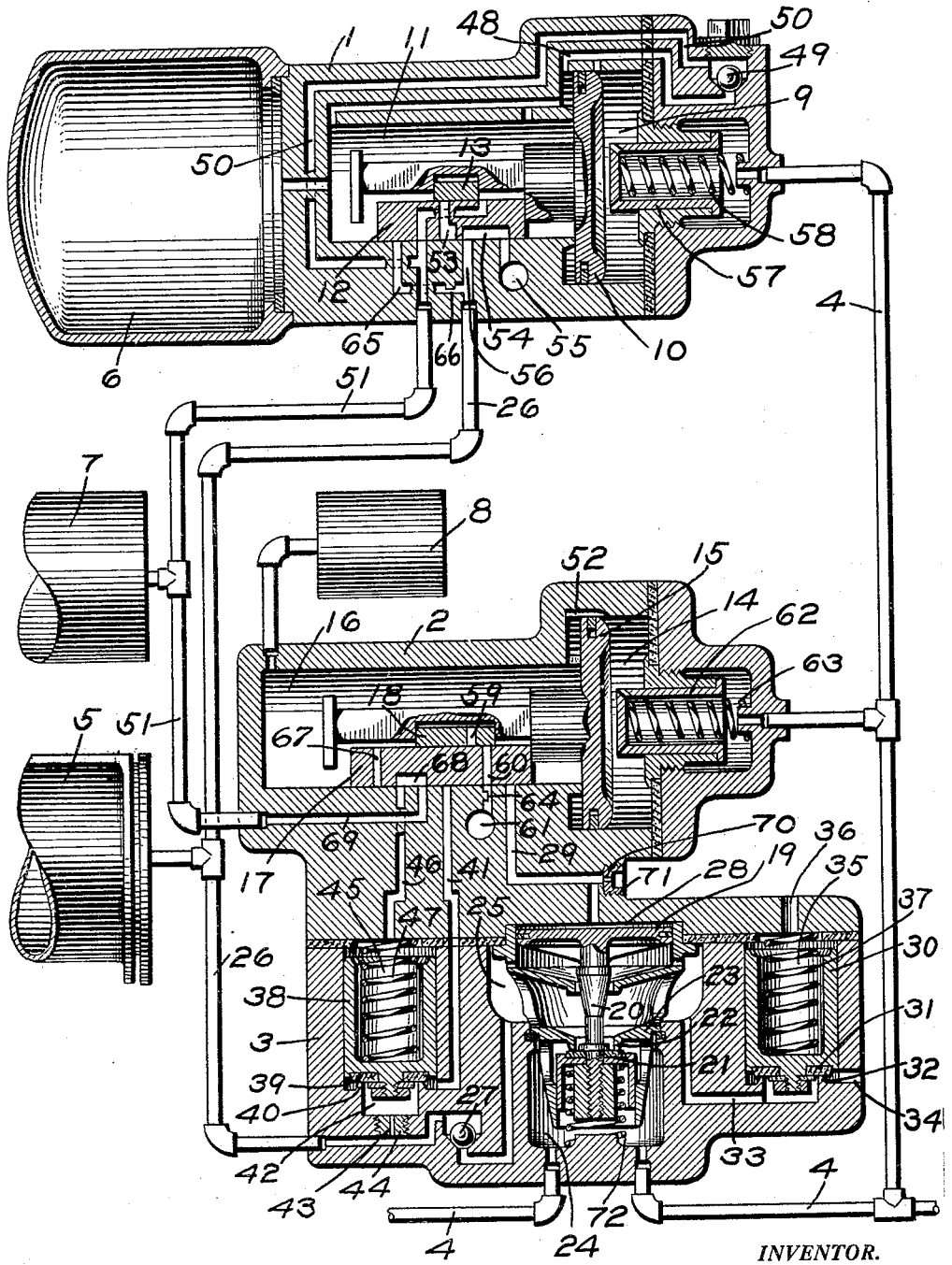

1,895,453

UNITED STATES PATENT OFFICE

SIDNEY G. DOWN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed May 14, 1931. Serial No. 537,259.

This invention relates to fluid pressure brakes and more particularly to an automatic fluid pressure brake equipment in which when an emergency application of the brakes is effected upon a sudden reduction in brake pipe pressure, an initial inshot of fluid under pressure is supplied to the brake cylinder to move the brake cylinder piston out and cause the brake shoes to engage the wheels and then fluid under pressure is supplied to the brake cylinder at a restricted rate for a period of time sufficient to ensure that the brakes will be applied without causing the slack to run in at an excessive and dangerous rate, and finally after the predetermined period of time, fluid under pressure is supplied to the brake cylinder at a rapid rate, to secure the desired high pressure in emergency.

The principal object of my invention is to provide an automatic fluid pressure brake equipment having improved and simplified means, and which can be cheaply manufactured for accomplishing the above purpose.

In the accompanying drawing, the single figure is a diagrammatic view, partly in section, of an automatic fluid pressure brake equipment embodying my invention.

The fluid pressure brake equipment may comprise a triple valve device having a casing 1, an emergency valve device having a casing 2, a quick action and inshot controlling valve device having a casing 3, which may be secured to the casing 2, a brake pipe 4, a brake cylinder 5, an auxiliary reservoir 6, an emergency reservoir 7, and a quick action reservoir 8.

The triple valve device has a piston chamber 9, connected to the brake pipe 4 and containing a piston 10, and a valve chamber 11, connected to the auxiliary reservoir 6 and containing a main slide valve 12 and a graduating slide valve 13 adapted to be operated by piston 10.

The emergency valve device has a piston chamber 14, connected to the brake pipe 4 and containing a piston 15 and a valve chamber 16, connected to the quick action reservoir 8, and containing a main slide valve 17 and an auxiliary slide valve 18 adapted to be operated by piston 15.

Mounted in the casing 3 is a quick action valve device comprising a piston 19 having a stem 20 carrying a vent valve 21. The valve 21 is adapted to engage an annular seat rib 22 provided on the cage 23, in which the piston 19 is mounted, and chamber 24, in which said valve is mounted is connected to the brake pipe 4.

Chamber 25, which opens to the under face of piston 19, is connected, through pipe 26, past a ball check valve 27 to the brake cylinder 5. Chamber 28, at the opposite side of the piston 19, is connected to a passage 29, leading to the seat of slide valve 17.

For venting fluid from the brake pipe to the atmosphere, under certain conditions, a valve piston 30 is provided in the casing 3. The valve piston 30 is provided at one end with a seat 31 adapted to engage an annular seat rib 32 and controls communication from chamber 25, through passage 33, to an atmospheric exhaust port 34. The chamber 35 at the opposite side of the valve piston is open to the atmosphere through a port 36, and contains a coil spring 37, which urges the seat 31 against the seat rib 32.

The final inshot to the brake cylinder is controlled by a valve piston 38, mounted in casing 3 and provided with a seat 39 adapted to engage a seat rib 40. The valve piston controls communication from a passage 41, leading to the seat of slide valve 17, to a chamber 42, which is connected to brake cylinder pipe 26 by way of a restricted port 43 in choke plug 44.

The chamber 45 at the opposite side of the valve piston 38 is connected to a passage 46, leading to the seat of slide valve 17 and contains a coil spring 47, adapted to urge the seat 39 against the seat rib 40.

In operation, when the brake system is being charged with fluid under pressure, fluid flows from the brake pipe 4 to piston chamber 9 of the triple valve device 1, and thence around the piston 10, through a feed passage 48 to valve chamber 11, thus charging the valve chamber 11 and the auxiliary reservoir 6 with fluid under pressure.

Fluid also flows from passage 48, past ball check valve 49, to a passage 50, which communicates with a pipe 51, leading to the emergency reservoir 7, so that the emergency reservoir 7 is charged with fluid under pressure.

Fluid under pressure also flows from the brake pipe to piston chamber 14 of the emergency valve device 2 and thence through a feed groove 52 around the piston 15 to valve chamber 16, so that the valve chamber and the quick action reservoir 8 are charged with fluid under pressure.

When the brake pipe pressure is gradually reduced to effect a service application of the brakes, the piston 10 is moved outwardly, first shifting the graduating valve 13 so as to uncover the service port 53 and then moving the main slide valve 12, so as to cut off communication from the brake cylinder 5 through pipe 26 and cavity 54 to the atmospheric exhaust port 55, and also cause the service port 53 to register with brake cylinder passage 56.

Fluid under pressure is then supplied from the auxiliary reservoir 6 to the brake cylinder 5, so as to effect a service application of the brakes in the usual manner, the stop 57, acted upon by spring 58, defining the service application position of the piston 10.

The gradual reduction in brake pipe pressure also causes the piston 15 of the emergency valve device 2 to move outwardly, the auxiliary valve 18 being thereby shifted, so that port 59 in the auxiliary valve 18 registers with port 60 in the main valve 17, which in turn is connected to atmospheric exhaust port 61. In this position, the piston 15 engages a spring stop member 62, acted upon by a spring 63, and fluid under pressure is vented from the valve chamber 16 and the quick action reservoir 8 at a service rate, as determined by a restricted portion 64 of the exhaust port 61.

The reduction in pressure in the valve chamber 16, as thus produced, prevents the further movement of the piston 15 toward emergency position.

When a sudden reduction in brake pipe pressure is initiated to effect an emergency application of the brakes, the triple valve piston 10 is moved out to emergency position, compressing the spring 58. In this position, a passage 65, leading to passage 56 is uncovered by the movement of the main slide valve 12, so that fluid under pressure is supplied from the auxiliary reservoir to the brake cylinder, through the passage 65. Passage 65 is provided with a restricted flow area 66, so that the rate of flow from the auxiliary reservoir to the brake cylinder is restricted to a rate such as will prevent the brake cylinder pressure from building up so rapidly as to cause the slack to run in at an excessive rate and thus cause excessive shocks.

The sudden reduction in brake pipe pressure causes the piston 15 of the emergency valve device 2 to make its full outward traverse, compressing the spring 63. The main valve 17 is thus moved to emergency position, in which port 60 registers with passage 29. Fluid under pressure is then supplied from the valve chamber 16 and the quick action reservoir 8 through registering ports 59 and 60 and passage 29 to piston chamber 28. The quick action piston 19 is therefore actuated, so as to unseat the vent valve 21, permitting the brake pipe 4 to be vented from chamber 24 to chamber 25 and thence past the check valve 27 to pipe 26 and the brake cylinder 5.

Fluid thus vented from the brake pipe to the brake cylinder serves as an initial inshot to insure the movement of the brake cylinder piston, so as to cause the brake shoes to engage the wheels. Fluid supplied from the brake pipe to chamber 25 also flows through passage 33 to the inner exposed area of the valve piston 30, and when the pressure of fluid has been increased to a predetermined degree, the pressure of spring 37 is overcome, and the valve piston is lifted from engagement with the seat rib 32. The full area of the valve piston 30 being now exposed to fluid pressure, a quick, positive movement of the valve piston to its upper seat is assured.

With the valve piston 30 unseated, fluid under pressure is now vented from the chamber 25 and the brake pipe 4, directly to the atmosphere, by way of port 34. The check valve 27 prevents any back flow of fluid from the brake cylinder to the atmosphere.

With the emergency slide valve 17 in emergency position, a port 67 in the slide valve registers with passage 46, so that the chamber 45 at the spring side of the valve piston 38 is now subjected to fluid at quick action reservoir pressure instead of emergency reservoir pressure. In the normal release position of the slide valve 17, the passage 46 is connected, through cavity 68 with a passage 69, leading to pipe 51 and the emergency reservoir, so that normally the valve piston 38 is maintained seated by emergency reservoir pressure.

The pressure in valve chamber 16 and in the quick action reservoir 8 slowly blows down by way of a restricted port 70 in choke plug 71, and consequently the pressure in chamber 45 is slowly reducing. The chamber 42 below the valve piston 30 is supplied through the restricted port 43 with fluid at the pressure in the brake cylinder, while the area of the valve piston outside of the seat rib 40 is subjected to fluid at emergency reservoir pressure, as supplied thereto, through passage 69, cavity 68 in the emergency slide valve 17, and passage 41. When the quick action reservoir pressure is reduced sufficiently to permit the increasing brake cylinder pressure, acting in chamber 42 on the exposed area of the valve piston 30, plus the pressure of fluid from the emergency reservoir acting on the area of the valve piston outside of the seat rib, to overcome the resistance of the spring 47, the valve piston will lift from its seat rib 40 and thus permit the flow of fluid from the emergency reservoir 7 to the brake cylinder.

The parts are so adjusted that the period of time, before the pressures are such as to cause the valve piston to lift from its seat, is such that the slack in the train will be permitted to gently run in, due to the slow rate of increase in brake cylinder pressure, as permitted during this period of time, by the flow from the auxiliary reservoir to the brake cylinder by way of the restricted port 66. The rate at which the brake cylinder pressure is built up by flow from the emergency reservoir, is determined by the restricted port 43.

With the above described equipment, the initial inshot to ensure the movement of the brake cylinder piston is obtained by flow of fluid from the brake pipe, and then in order to ensure that the brake pipe pressure will be reduced sufficiently to secure the desired degree of local quick action venting of fluid from the brake pipe, the valve piston 30 operates at a predetermined pressure of fluid vented from the brake pipe to the brake cylinder, to open an atmospheric vent to the brake pipe.

After the pressure in the quick action reservoir has been reduced by flow to the atmosphere through the restricted port 70 to a degree less than the reduced brake pipe pressure in chamber 14, the emergency piston 15 is moved away from emergency position by the spring stop 62, so that the auxiliary valve 18 is moved to cut off communication between ports 60 and 59. The restricted port 70 then rapidly reduces the pressure in piston chamber 28 to atmosphere, so that spring 72 acts to seat the valve 21 and move the piston 19 back to its normal position.

It will now be seen that in effecting an emergency application of the brakes, the triple valve device operates to supply fluid under pressure from the auxiliary reservoir to the brake cylinder at a restricted rate, and the operation of the emergency valve device causes the quick action valve mechanism to act to vent fluid from the brake pipe to the brake cylinder and when the pressure of fluid vented to the brake cylinder has been increased to a predetermined degree, a valve means is operated to further vent the brake pipe to the atmosphere.

After a predetermined period of time, during which fluid under pressure is supplied from the auxiliary reservoir to the brake cylinder at a restricted rate, a final inshot valve means is operated to supply fluid under pressure from an emergency reservoir to the brake cylinder.

While one illustrative embodiment of the invention has been described in detail, it is not by intention to limit its scope to that embodiment or otherwise than by the terms of the appended claims.

Having now described my invention, what I claim as new and desire to secure by Letters Patent, is:

1. In a fluid pressure brake, the combination with a brake pipe, auxiliary reservoir, and a brake cylinder, of a triple valve device operated upon a sudden reduction in brake pipe pressure for supplying fluid under pressure from the auxiliary reservoir to the brake cylinder at a restricted rate, a quick action valve mechanism operable to vent fluid under pressure from the brake pipe to the brake cylinder, and valve means operated upon a predetermined increase in the pressure of fluid supplied from the brake pipe to the brake cylinder for opening a communication through which fluid under pressure is vented from the brake pipe to the atmosphere.

2. In a fluid pressure brake, the combination with a brake pipe, auxiliary reservoir, and a brake cylinder, of a triple valve device operated upon a sudden reduction in brake pipe pressure for supplying fluid under pressure from the auxiliary reservoir to the brake cylinder at a restricted rate, a quick action valve mechanism operable to vent fluid under pressure from the brake pipe to the brake cylinder, valve means operated upon a predetermined increase in the pressure of fluid supplied from the brake pipe to the brake cylinder for opening a communication through which fluid under pressure is vented from the brake pipe to the atmosphere, and an emergency valve device operated upon a sudden reduction in brake pipe pressure for effecting the operation of said quick action valve mechanism.

3. In a fluid pressure brake, the combination with a brake pipe, auxiliary reservoir, and a brake cylinder, of a triple valve device operated upon a sudden reduction in brake pipe pressure for supplying fluid under pressure from the auxiliary reservoir to the brake cylinder at a restricted rate, a quick action valve mechanism operable to vent fluid under pressure from the brake pipe to the brake cylinder, valve means operated upon a predetermined increase in the pressure of fluid supplied from the brake pipe to the brake cylinder for opening a communication through which fluid under pressure is vented from the brake pipe to the atmosphere, a check valve for preventing back flow from the brake cylinder to the brake pipe, and an emergency valve device operated upon a sudden reduction in brake pipe pressure for effecting the operation of said quick action valve mechanism.

In testimony whereof I have hereunto set my hand, this 11th day of May, 1931.

SIDNEY G. DOWN.